United States Patent
Eppright

(10) Patent No.: US 10,486,753 B2
(45) Date of Patent: Nov. 26, 2019

(54) TRANSFORMING TOP DRIVE VEHICLE

(71) Applicant: Ultimate Top Drives LLC, Austin, TX (US)

(72) Inventor: Russell Eppright, Austin, TX (US)

(73) Assignee: Ultimate Top Drives LLC, Austin, TX (US)

( * ) Notice: Subject to any disclaimer, the term of this patent is extended or adjusted under 35 U.S.C. 154(b) by 0 days.

(21) Appl. No.: 16/030,028

(22) Filed: Jul. 9, 2018

(65) Prior Publication Data

US 2019/0047481 A1    Feb. 14, 2019

Related U.S. Application Data

(60) Provisional application No. 62/544,270, filed on Aug. 11, 2017.

(51) Int. Cl.
*B62D 33/063*      (2006.01)
*B62D 33/06*      (2006.01)
*B62D 33/073*      (2006.01)

(52) U.S. Cl.
CPC ....... *B62D 33/0636* (2013.01); *B62D 33/063* (2013.01); *B62D 33/0608* (2013.01); *B62D 33/073* (2013.01)

(58) Field of Classification Search
CPC ....... A01M 31/02; B60N 2/16; B60N 2/1605; B60N 2/163; B60N 2/1635; B60P 1/02;
(Continued)

(56) References Cited

U.S. PATENT DOCUMENTS 2,478,717 A * 8/1949 Simpson .................. E05F 3/02
                                                                                16/66
2,798,568 A * 7/1957 Zeller ................ B62D 33/0636
                                                                               180/78

(Continued)

FOREIGN PATENT DOCUMENTS

CN         101092117 A     12/2007
CN         204821073 U     12/2015
(Continued)

OTHER PUBLICATIONS

International Search Report and Written Opinion dated Dec. 3, 2018, in corresponding International Patent Application No. PCT/US2018/046192.

(Continued)

*Primary Examiner* — Jason S Daniels

(57) ABSTRACT

A transforming top drive vehicle having a passenger compartment and a separable base is disclosed. One or more hydraulic cylinders are positioned between the compartment and the base to provide force sufficient to raise the compartment. Concentric pipes having sufficient strength to support the compartment are installed with one end connected to the vehicle's base and the other connected to the passenger compartment. The vehicle allows ease of access and the ability to lower the vehicle's center of gravity when navigating rough or uneven terrain and, when the operator is interested in obtaining a better view of wildlife or otherwise increase the field of vision, the passenger compartment can be raised either incrementally or to its fully raised position.

16 Claims, 7 Drawing Sheets

(58) Field of Classification Search
CPC ...... B60R 9/04; B62D 27/06; B62D 33/0608; B62D 33/063; B62D 33/0636
USPC .............................. 296/26.04, 26.05, 190.04
See application file for complete search history.

(56) References Cited

U.S. PATENT DOCUMENTS

| | | | | |
|---|---|---|---|---|
| 3,252,546 | A | * | 5/1966 | Allin, Jr. ................ B62D 33/06 180/89.12 |
| 3,319,739 | A | * | 5/1967 | Morse .................... A01D 46/20 182/2.3 |
| 3,479,080 | A | * | 11/1969 | Hilfiker .................... B62D 1/19 180/89.1 |
| 3,524,563 | A | | 8/1970 | McCartney et al. |
| 4,018,473 | A | * | 4/1977 | Chalupsky ........... B62D 33/063 180/69.2 |
| 6,439,635 | B1 | * | 8/2002 | Hardy ................... A01M 31/02 182/69.6 |
| 2003/0143061 | A1 | | 7/2003 | Odorizzi |
| 2003/0168286 | A1 | * | 9/2003 | Brown ................... B62D 33/00 187/222 |
| 2008/0302602 | A1 | * | 12/2008 | Schultz ................. A01M 31/02 182/69.4 |
| 2009/0091096 | A1 | | 4/2009 | Samaniego |
| 2009/0205880 | A1 | | 8/2009 | Hammonds |
| 2011/0280700 | A1 | | 11/2011 | Uttech et al. |
| 2014/0202792 | A1 | * | 7/2014 | Stoneburner, Jr. ...... B66F 11/04 182/69.4 |
| 2016/0229276 | A1 | | 8/2016 | James et al. |
| 2019/0070993 | A1 | * | 3/2019 | Bove ......................... B60P 1/02 |

FOREIGN PATENT DOCUMENTS

| | | | |
|---|---|---|---|
| CN | 205365365 U | | 7/2016 |
| DE | 19715066 U1 | * | 10/1997 |
| JP | 62083254 A | * | 4/1987 ............... B60N 2/14 |

OTHER PUBLICATIONS

Industrial Man Lift, Product 5492RT, Ultra Dual Deck Rough Terrain Scissor Lift, www.industrialmanlifts.com/product/5492rt-ultra-dual-deck-rough-terrain-scissor-lift/.

* cited by examiner

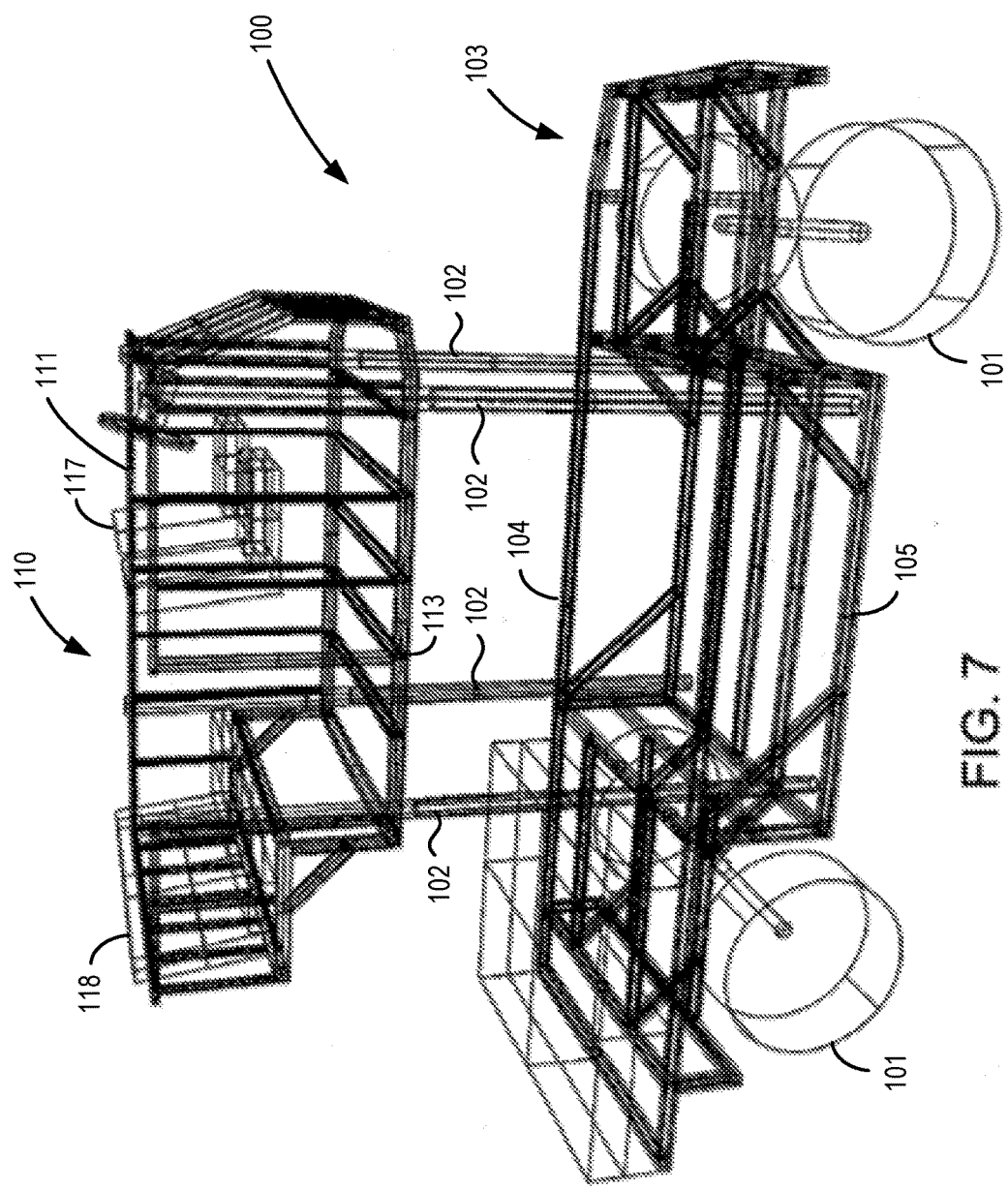

TRANSFORMING TOP DRIVE VEHICLE

PRIORITY STATEMENT UNDER 35 U.S.C. § 119 & 37 C.F.R. § 1.78

This non-provisional application claims priority based upon prior U.S. Provisional Patent Application Ser. No. 62/544,270 filed Aug. 11, 2017, in the name of Russell Eppright entitled "TRANSFORMING TOP DRIVE VEHICLE," the disclosures of which are incorporated herein in their entirety by reference as if fully set forth herein.

BACKGROUND OF THE INVENTION

A "top drive" vehicle is a term used for a modified off-road vehicle, such as a truck or SUV, that has a deck mounted above the roof of the vehicle with railing around the deck, and with driver and passenger seats on the deck. The vehicle is then modified, so that it can be driven from the deck instead of the standard driver's seat in the original vehicle. The vehicle is modified in this manner to afford the driver and passengers a better view of the surrounding wildlife for photo safaris, hunting or related activities. In most cases these vehicles are used in terrain having low brush or grass, in which case the view from the roof provides an improved line of sight over the standard driver's or passenger's seats.

However, conventional top drive vehicles have several significant drawbacks. First, because they are top-heavy, they can be very dangerous to drive in rough or uneven terrain. They are also very uncomfortable for the passengers when traveling over even slightly rough or uneven terrain since the vehicle's movement is magnified due to the passenger compartment being so high. In addition, the passenger compartment in this type of vehicle is extremely cumbersome to enter and exit.

It would beneficial, therefore, to have a vehicle which provided an enhanced line of sight to surrounding wildlife while also having a lower center of gravity to navigate rough or uneven terrain while facilitating ingress and egress.

SUMMARY OF THE INVENTION

A vehicle is presented having a base with wheels, a steering system, a braking system and a separable passenger compartment having a steering mechanism and a braking mechanism. One or more hydraulic cylinders are positioned between the base and the compartment to provide force sufficient to raise the passenger compartment. The hydraulic cylinders are fluidly connected to one or more hydraulic pump systems through, for example, one or more hydraulic fluid lines. The one or more hydraulic pump systems, and therefore the hydraulic cylinders, are controllable through a switch located in the passenger compartment.

In one embodiment, a telescopic hydraulic cylinder is secured to the vehicle's base and connected to the passenger compartment. Actuation of the hydraulic cylinder raises the passenger compartment above the base. In another embodiment, two hydraulic cylinders are connected to one another in series, with one positioned to extend its piston rod upward towards the passenger compartment and one positioned to extend its piston rod downward towards the vehicle's base. Two hydraulic fluid lines are in fluidic communication with each hydraulic cylinder. When actuated, the two hydraulic cylinders work in concert to raise the passenger compartment above the base.

Concentric pipes having sufficient strength to support the compartment are installed vertically to carry the load of the compartment. The concentric telescoping pipes are positioned vertically, with one end connected to the vehicle's base and the other connected to the passenger compartment. In one embodiment, the hydraulic cylinders are separated from the pipes and in another embodiment, hydraulic cylinders are positioned inside the pipes. In either case, the pipes may be located within the vehicle's base in any locations which adequately supports the passenger compartment.

To use the vehicle, the operator simply climbs a set of stairs to enter the vehicle, closes the door and sits in the driver's seat. The operator can then drive the vehicle in its normal mode. When the operator is interested in increasing his field of vision, such as to obtain a better view of wildlife, he can raise the passenger compartment either incrementally or to its fully raised position by operating the switch. When the operator encounters rough or uneven terrain, he can lower the passenger compartment to its lowest position to maximize the stability of the vehicle.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which:

FIG. 7 is a schematic depiction in perspective showing the basic elements of the top drive vehicle generally as shown in FIG. 2.

DESCRIPTION OF THE PREFERRED EMBODIMENTS

Figure 1:
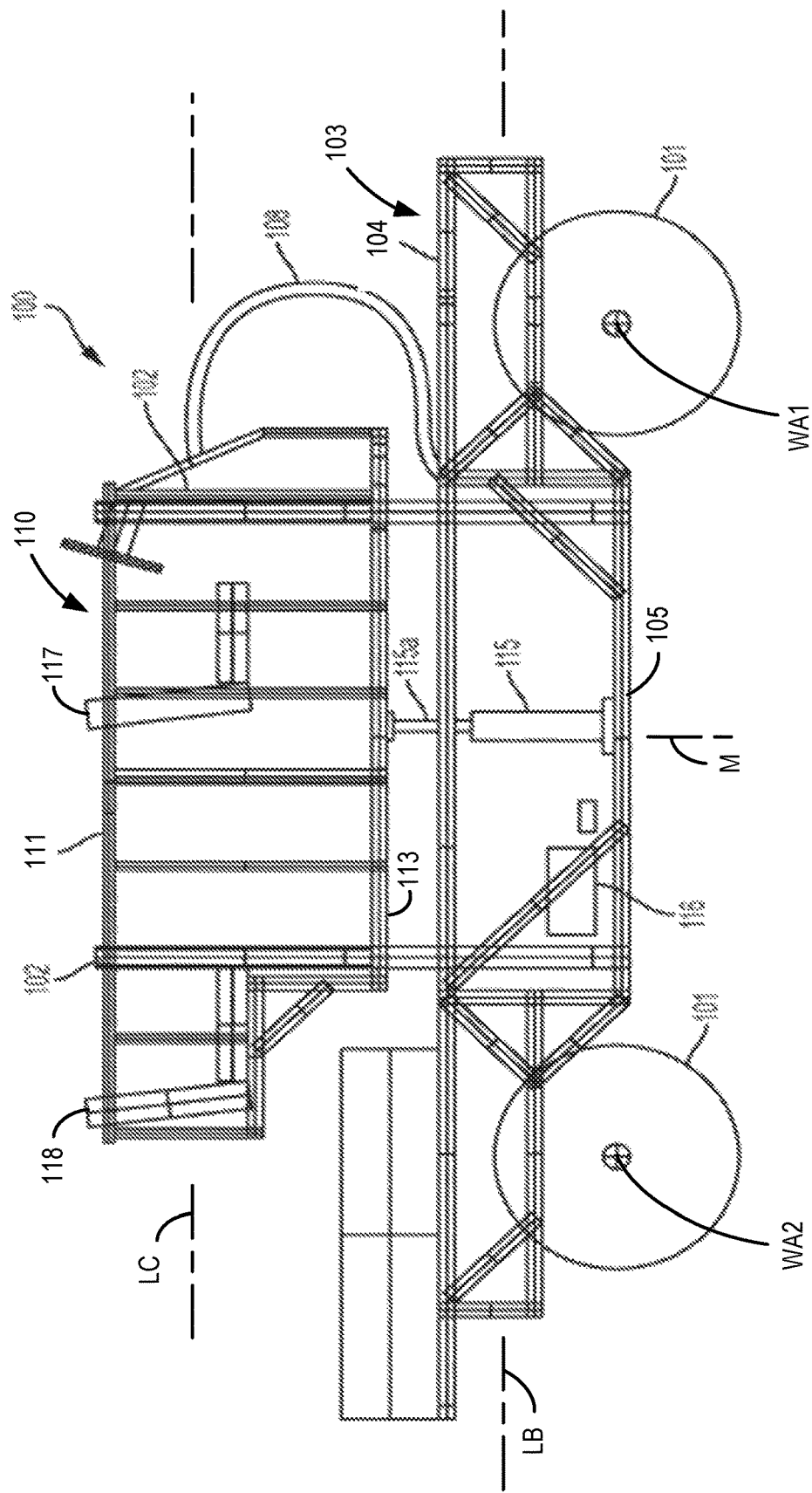
FIG. 1 is a schematic depiction of one embodiment of the vehicle of the present invention in which the passenger compartment is in the fully lowered position.

The present invention is directed to improved methods and systems for, among other things, top driving vehicles. The configuration and use of the presently preferred embodiments are discussed in detail below. It should be appreciated, however, that the present invention provides many applicable inventive concepts that can be embodied in a wide variety of contexts other than top driving vehicles. Accordingly, the specific embodiments discussed are merely illustrative of specific ways to make and use the invention, and do not limit the scope of the invention. In addition, the following terms shall have the associated meaning when used herein:

"concentric" means sharing a common center, the larger often completely surrounding the smaller "hydraulic cylinder" means any type or form of electric or pneumatic mechanical linear actuator that is used to provide a force through a stroke;

"pipe" means a tube, pipe or other hollow linear structure, such structure having a round, oval, square or other cross-section, and having sufficient strength to support the weight of the deck of the vehicle; and "vehicle" means any device used for transporting people or goods, especially on land, such as a car, truck, or cart.

As used in the following disclosure and claims, relative positional terms such as upper, lower, top, rear, front, forward, rearward, uppermost, and lowermost, for example, are used with reference to the orientation of the vehicle shown in the drawings.

When hunting game in open terrain or photographing wildlife on a safari, it can be difficult to see, or to maintain visual contact with, animals as they move through the brush. One of the reasons is that the brush or rolling topography interferes with the viewer's line of sight. In some instances, hunters or photographers will use elevated stands to obtain a better visual angle, or line of sight, to the animals. However, a significant drawback to the use of such stands is that they are stationary and not readily moveable.

As a solution to the issues associated with these stationary stands, hunters and photographers often use "top drive" vehicles. "Top drive" is a term used for a modified, off-road vehicle, such as a truck or SUV, that has a deck mounted on the roof of the vehicle. The deck is configured with driver and passenger seats and, in most cases; there is a railing around the deck to prevent passengers from falling off. In some instances, the vehicle is modified so that the deck is further equipped with controls, such as accelerator, brake, shift lever and the like, for driving the vehicle so that the vehicle can optionally be driven from the deck rather than the original driver's seat. The purpose is so that the driver and passengers can have a better view of the wildlife. These vehicles are typically used in terrain with low brush or grass.

In most instances, conventional top drive vehicles require passengers to access the deck of the vehicle by climbing a ladder or stairs. This makes ingress into, and egress from, the vehicle very cumbersome. Moreover, because the deck is located on the top of the vehicle, the weight of passengers on the deck raises the center of gravity of the vehicle to a point where the vehicle can be unsafe to drive, even on relatively flat terrain, and the severity of this problem increases with the number of passengers on the deck. Also, because the deck is mounted on top of the vehicles, deviations or areas of unevenness in the terrain over which the vehicle is traversing are magnified from the perspective of the passengers, resulting in serious safety concerns and causing passenger discomfort due to the swaying or pitching of the deck area.

There are a number of other substantial drawbacks to conventional top drive vehicles. For example, top drive vehicles of the past are typically not high enough off of the ground to view wildlife in low brush terrain, and the height of the deck is, in most cases, not adjustable. In addition, a conventional top drive vehicle is limited to serving as a top drive vehicle and it does not convert into a standard vehicle, thereby significantly limiting the types of roads and terrain over which the vehicle may travel.

In various embodiments of the vehicle of the present invention, the vehicle's drive and the passenger compartment can be intermittently raised and lowered. This allows the driver to raise the compartment and navigate the terrain to see wildlife much better than a conventional off-road vehicle. The compartment can then be lowered, which significantly lowers the center of gravity of the vehicle, to navigate through rough or uneven terrain and, therefore, travel to many places a conventional top drive can't go safely, or at all. The compartment may also be lowered for easier ingress and egress of the vehicle.

Figure 2:
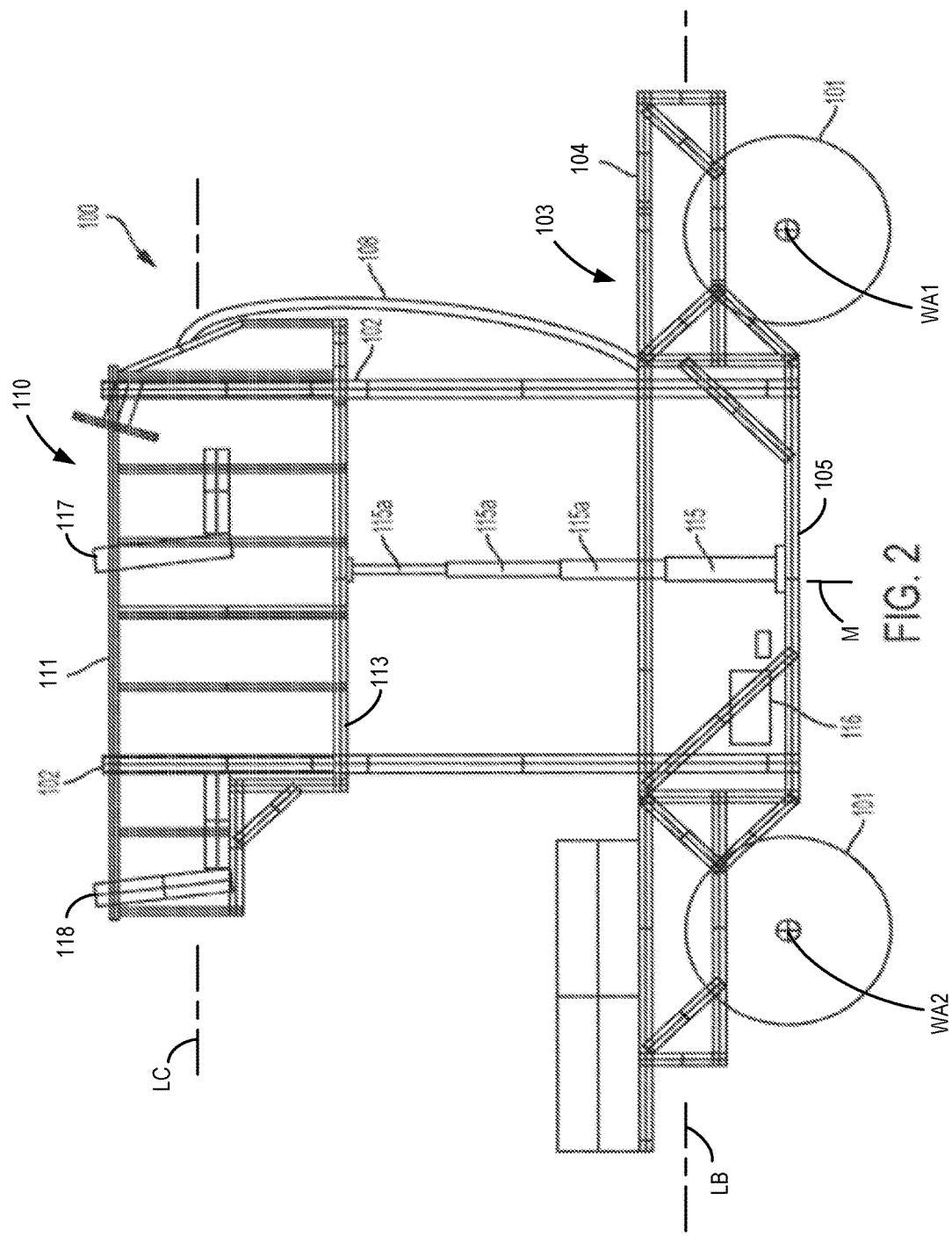
FIG. 2 is a schematic depiction of the same embodiment of the vehicle of the present invention in which the passenger compartment is in the fully raised position.

Referring now to FIGS. 1, 2, and 7 a top drive vehicle 100 according to one embodiment of the present invention has a vehicle base 103 which is elongated about a base axis LB shown in FIGS. 1 and 2 and defines an uppermost surface 104 and a lowermost surface 105. Top drive vehicle 100 further includes four wheels 101, a suspension system connecting the wheels 101 to the vehicle base 103, a motor, a hydraulic pump system 116 (not shown in FIG. 7), a brake system, a steering system, and a passenger compartment 110 with a driver or front seat 117 and rear seat 118 for passengers. As shown in FIGS. 1 and 2, passenger compartment 110 extends along a passenger compartment axis LC parallel to base axis LB and defines an uppermost surface 111 and a lowermost surface 113. The vehicle base 103 may be powered by various systems to move the vehicle 100 such as electric motor or motors, gasoline, propane, natural gas, or diesel reciprocating engine, or a combination thereof such as a hybrid vehicle. Steering may be accomplished by utilizing a steering wheel or other methods known in the art, such as a joystick.

In one embodiment, a guide assembly is connected between the vehicle base 103 and passenger compartment 110 including a set of one or more front guides and a set of one or more rear guides. In the example of FIGS. 1 and 2, the guide assembly includes concentric pipes 102 which may move between a lowered position and a raised position and function to guide passenger compartment 110 along its range of movement between a lowermost or lowered position shown in FIG. 1 and an elevated position shown in FIGS. 2 and 7. These concentric telescoping pipe arrangements are preferably of sufficient strength to support the driver and passenger compartment 110 and may be installed vertically to carry the load of the compartment 110. In any event, the guides in this example comprising the arrangements of concentric pipes 102 have sufficient strength in the structure to guide passenger compartment 110 appropriately and reasonably prevent deflection of the passenger compartment both out of horizontal alignment with base 103 and out of lateral alignment with base 103. A linear actuator system, in this case hydraulic cylinder 115, is configured to move between retracted condition shown in FIG. 1 and an extended condition to raise and lower passenger compartment 110 above the base 103. The hydraulic cylinder 115 is fluidly connected to one or more hydraulic pump systems 116.

Figure 3:
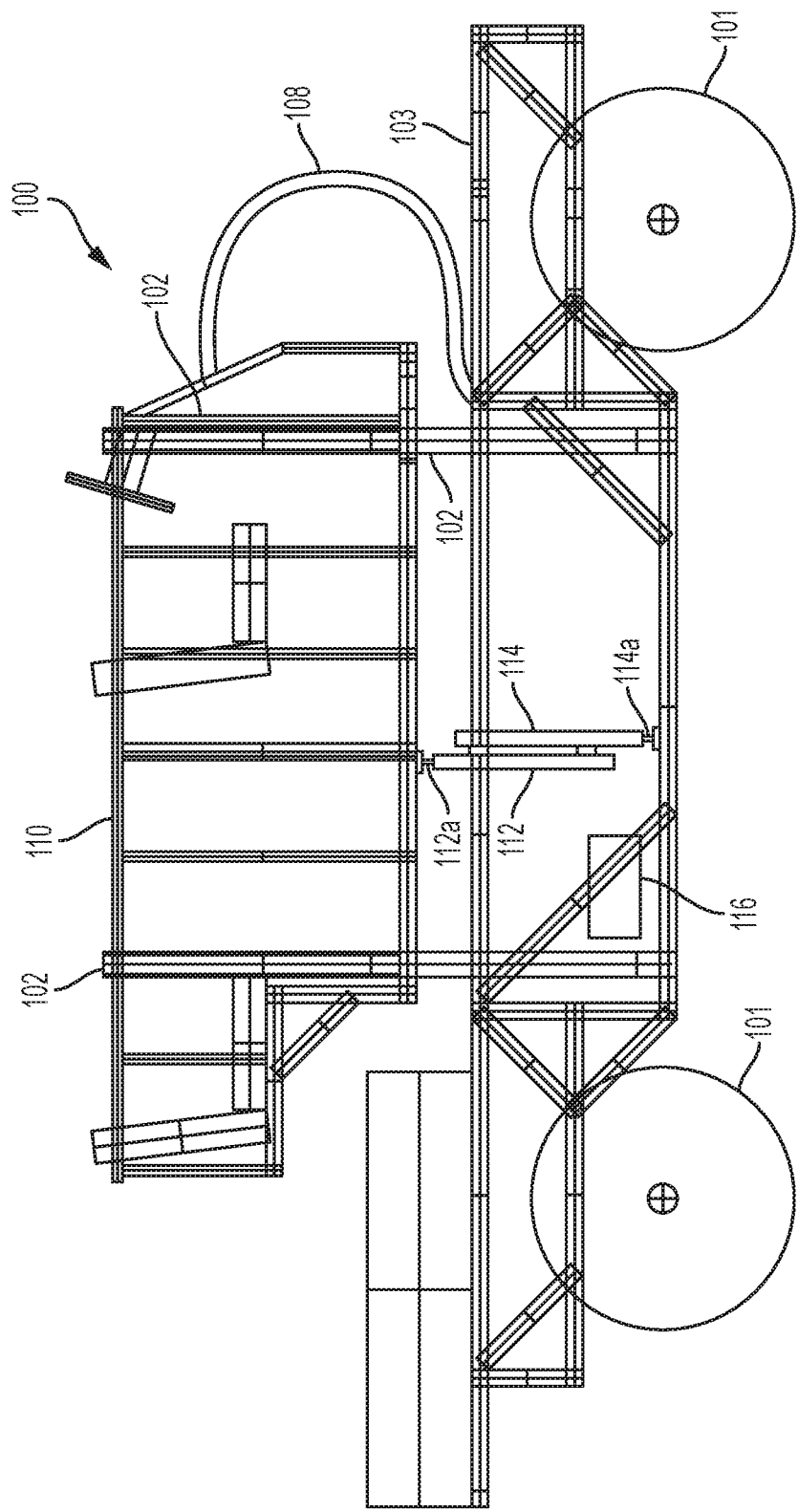
FIG. 3 is a schematic depiction of an alternative embodiment of the vehicle of the present invention in which the passenger compartment is in the fully lowered position.
Figure 4:
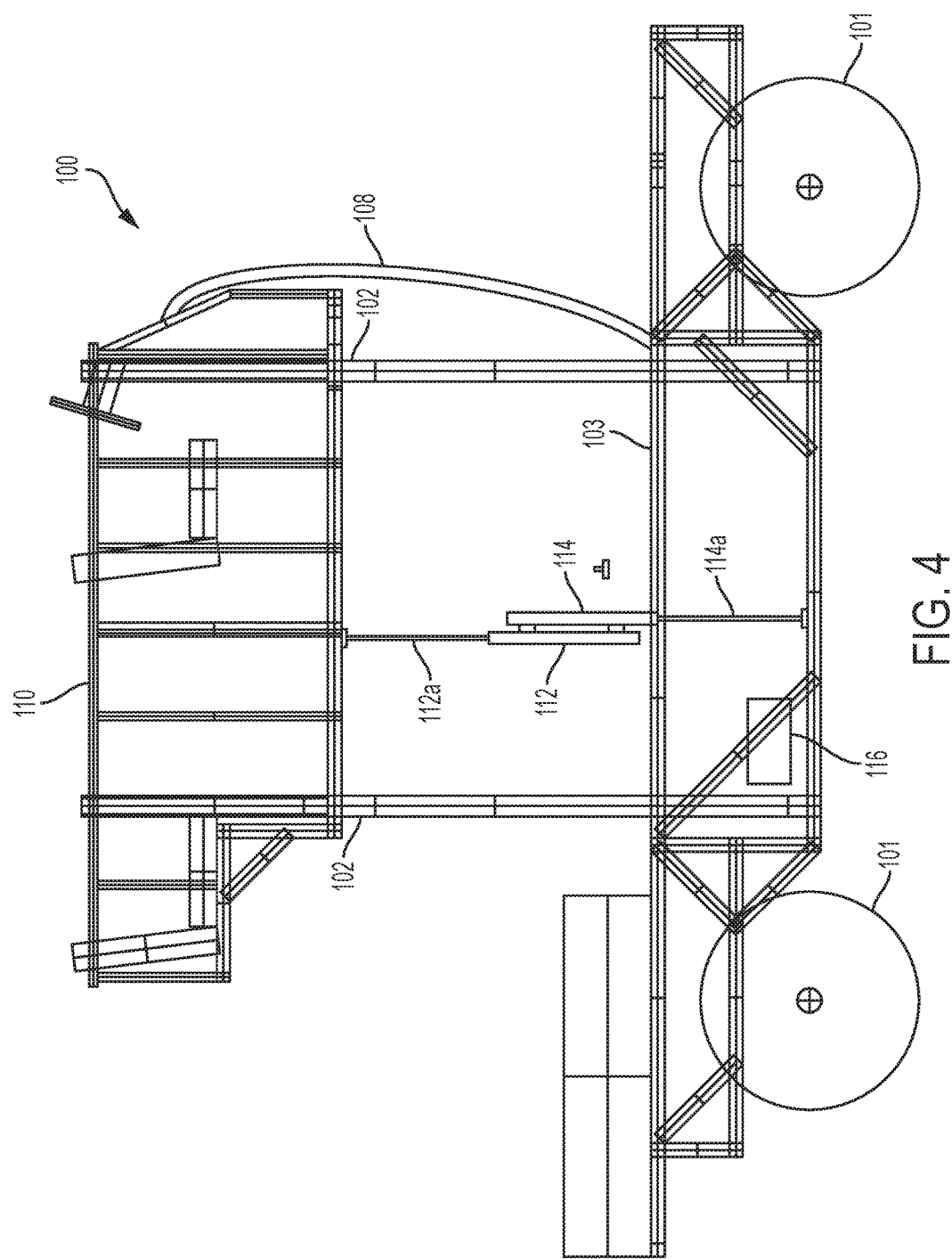
FIG. 4 is a schematic depiction of the alternative embodiment of the vehicle of the present invention in which the passenger compartment is in the fully raised position.

In another embodiment, and as shown in FIG. 3 and FIG. 4, concentric pipes 102 of sufficient strength to support the driver and passenger compartment 110 are again installed vertically to carry the load of the compartment 110. However, a linear actuator system made up of hydraulic cylinders 112, 114 is configured to raise and lower the driver and passenger compartment 110 relative to the base 103. The hydraulic cylinders 112, 114 are fluidly connected to one or more hydraulic pump systems 116 and flow dividers through one or more hydraulic fluid lines (not shown).

In typical embodiments, the hydraulic cylinders are comprised of three main components: a cylinder barrel, a piston and a piston rod. The cylinder barrel provides the housing in which the piston, connected to the piston rod, moves in and out of the cylinder. The barrel is closed on one end by the cylinder cap and the other end by the cylinder head where the piston rod extends out of the cylinder. The piston may be configured with sliding rings and seals.

The piston separates the pressure zones inside the cylinder. Pistons are typically configured with grooves to fit seals and bearing elements. The difference in pressure between the two sides of the piston causes the piston rod to extend and retract. The piston may be attached to the piston rod by means of threads, bolts, nuts or other attaching devices known in the art.

The piston rod extends from the cylinder through the cylinder head and connects the hydraulic actuator to the area to which force is to be applied, such as the frame of the passenger compartment or the frame of the base. The piston rod is typically finely machined and polished, thereby providing a reliable seal and prevent leakage around the cylinder head.

The hydraulic cylinder is attached to a hydraulic pump system which is configured to deliver a fixed or regulated flow of pressurized hydraulic fluid, typically oil, to the hydraulic cylinder to move the piston. Hydraulic fluid enters through a port at one end of the cylinder and returns through a port typically located at the same end of the cylinder.

Some embodiments of the invention also include a linear actuator system control, such as a suitable spring-to-center rocker switch, that is in electronic communication with the hydraulic pump. The form of electronic communication may be wiring through flexible conduit. Other controls for the operation of the vehicle, such as steering lines, brakes lines and the like, may also be included in the flexible conduit.

Referring now back to FIG. 1 and FIG. 2, the hydraulic cylinder 115 is configured to raise and lower the passenger compartment 110. In the embodiment shown, the hydraulic cylinder is a telescopic cylinder having two or more stages. When actuated, the piston rod 115a, which is attached to the passenger compartment 110, extends and thereby raises the passenger compartment 110.

Referring now back to FIG. 3 and FIG. 4, hydraulic cylinders 112, 114 are again configured to raise and lower the passenger compartment 110. In the embodiment shown, two hydraulic cylinders 112, 114 are connected to one another in series, with one 112 positioned to extend its piston rod 112a upward towards the passenger compartment 110 and one 114 positioned to extend its piston rod 114a downward towards the vehicle's base 103. In some embodiments, two hydraulic fluid lines are in fluidic communication with each hydraulic cylinder 112, 114.

In the exemplary embodiment shown in FIG. 3 and FIG. 4, a single "piggyback" linear actuator system is created by connecting two 20" stroke cylinders together in series with one cylinder positioned to extend its piston rod towards the passenger compartment and one positioned to extend its piston rod towards the vehicle's base. The two cylinders may be affixed to one another by welding, flanges, trunnions, devises, lugs or other cylinder mounting devices known in the art. The piston rod is also configured with mounting attachments to connect the piston rod to the passenger compartment. The piggyback linear actuator system is positioned near the center of mass of the passenger compartment, and it is configured to create a 40" total stroke in less than 30" when the piston rods in both hydraulic cylinders are retracted.

In use, the concentric pipes 102 are positioned vertically and connected to the vehicle's base 103 and passenger compartment 110. The pipes 102 may be located within the vehicle's base 103 in any locations which adequately supports the passenger compartment 110. In one embodiment, the pipes 102 are positioned near each of the four corners of the passenger compartment 110 which is generally centered on and above the vehicle's base 103. In both the examples of FIGS. 1 and 2 and FIGS. 3 and 4, the front pipes 102 are located between the base midpoint M and front wheel attachment axis WA1, while the rear pipes 102 are located between the base midpoint M and rear wheel attachment axis WA2 (base midpoint M and the wheel attachment axes being shown only in FIGS. 1 and 2). It is noted that in the illustrated position of rear pipes 102, rear seat 118 is mounted in the passenger compartment 110 rearwardly of the rear pipes 102.

A flexible conduit 108 described above is attached on one end to the vehicle base 103 and on the other end to the passenger compartment 110. The flexible conduit 108 is of sufficient length so that when the passenger compartment 110 is raised it extends to become nearly straight and vertical. When the passenger compartment 110 is lowered, the flexible conduit 108 simply bows in an arc shape. In some embodiments, the switch described above is mounted on an instrument panel in the passenger compartment and the wiring is run through the flexible conduit 108 to the hydraulic pump system 116, thereby allowing the operator to activate the hydraulic pump system 116 by activating the switch.

Figure 5A:
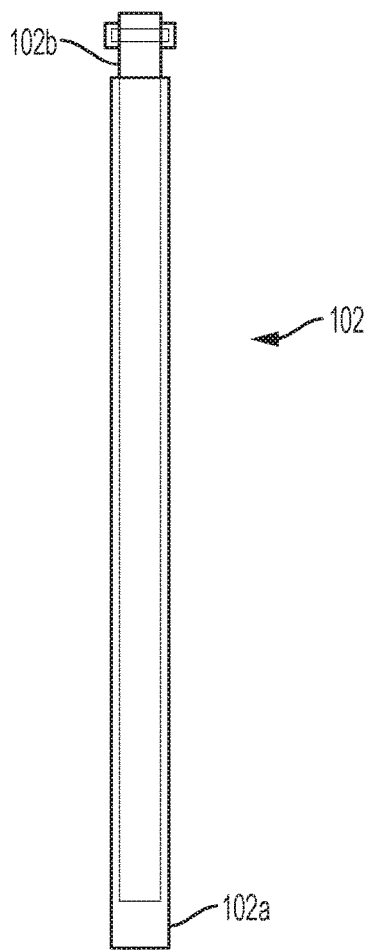
FIG. 5A is a schematic depiction of one embodiment of the pipes used to support the passenger compartment of the vehicle of the present invention in a lowered configuration.
Figure 5B:
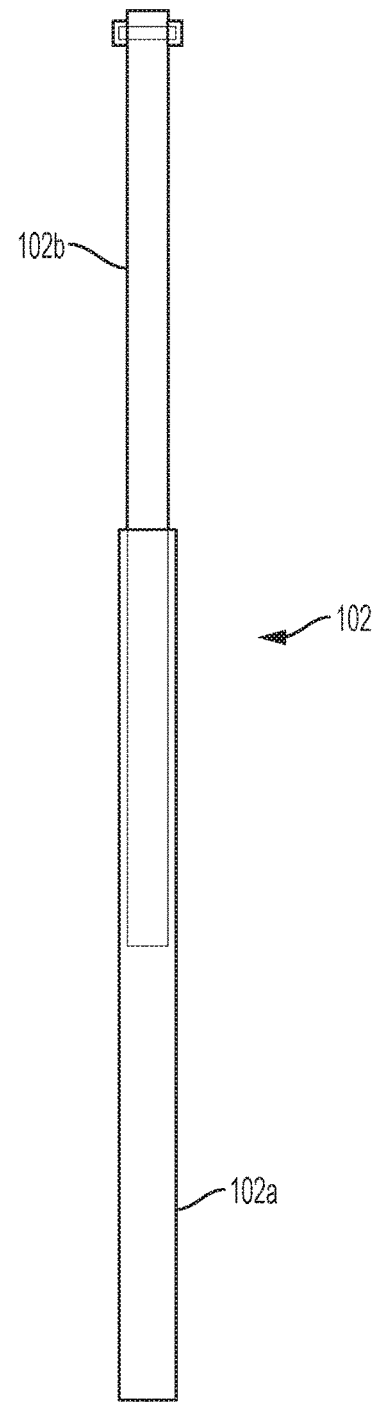
FIG. 5B is a schematic depiction of one embodiment of the pipes used to support the passenger compartment of the vehicle of the present invention in a raised or extended configuration.

As described above, the passenger compartment 110 sits roughly over the center of the vehicle base 103. As shown in FIG. 5A and FIG. 5B, each of the pipe arrangements 102 includes a respective outer pipe 102a comprising a lower guide member and an inner pipe 102b comprising an upper guide member. The outer pipes 102a are attached near the four corners of the passenger compartment 103 and slide up and down over the inner pipes 102b, which are attached to the vehicle's base 103. The movement of the pipes relative to one another is powered by the hydraulic cylinders 112, 114. The close fit of the inner pipe 102b inside an outer pipe 102a provides internal stability to the vehicle 100, whether the passenger compartment 103 is raised or lowered, at least in part due to the overlap in the outer pipe 102a and the inner pipe 102b even when the passenger compartment 103 is in the raised, elevated position. That is, the overlap between outer pipe 102a and inner pipe 102b in each pipe arrangement 102, ensures that passenger compartment 110 remains in the desired level position at each position of the passenger compartment from the lowermost position shown in FIG. 1 for example, and the elevated position shown in FIGS. 2 and 7 for example, even though the embodiment only includes a single linear actuator system acting between the base 103 and passenger compartment 110.

In some embodiments, compression springs (not shown) are positioned inside each pipe assembly 102 so that, in the event of a failure of the hydraulic system, the passenger compartment 103 will be supported by the springs.

Also in some embodiments, a fairly tight, but no completely airtight, seal between an inner pipe 102b and outer pipe 102a is created so that the air pressure between the pipes creates a cushion of air, thereby allowing the platform 103 to descend slowly in the event of a failure of the hydraulic system. It may also be desirable to include an air check valve to mitigate any air suction pressure between the inner pipe 102b and the outer pipe 102a when the platform is ascending.

Figures 6A, 6B:
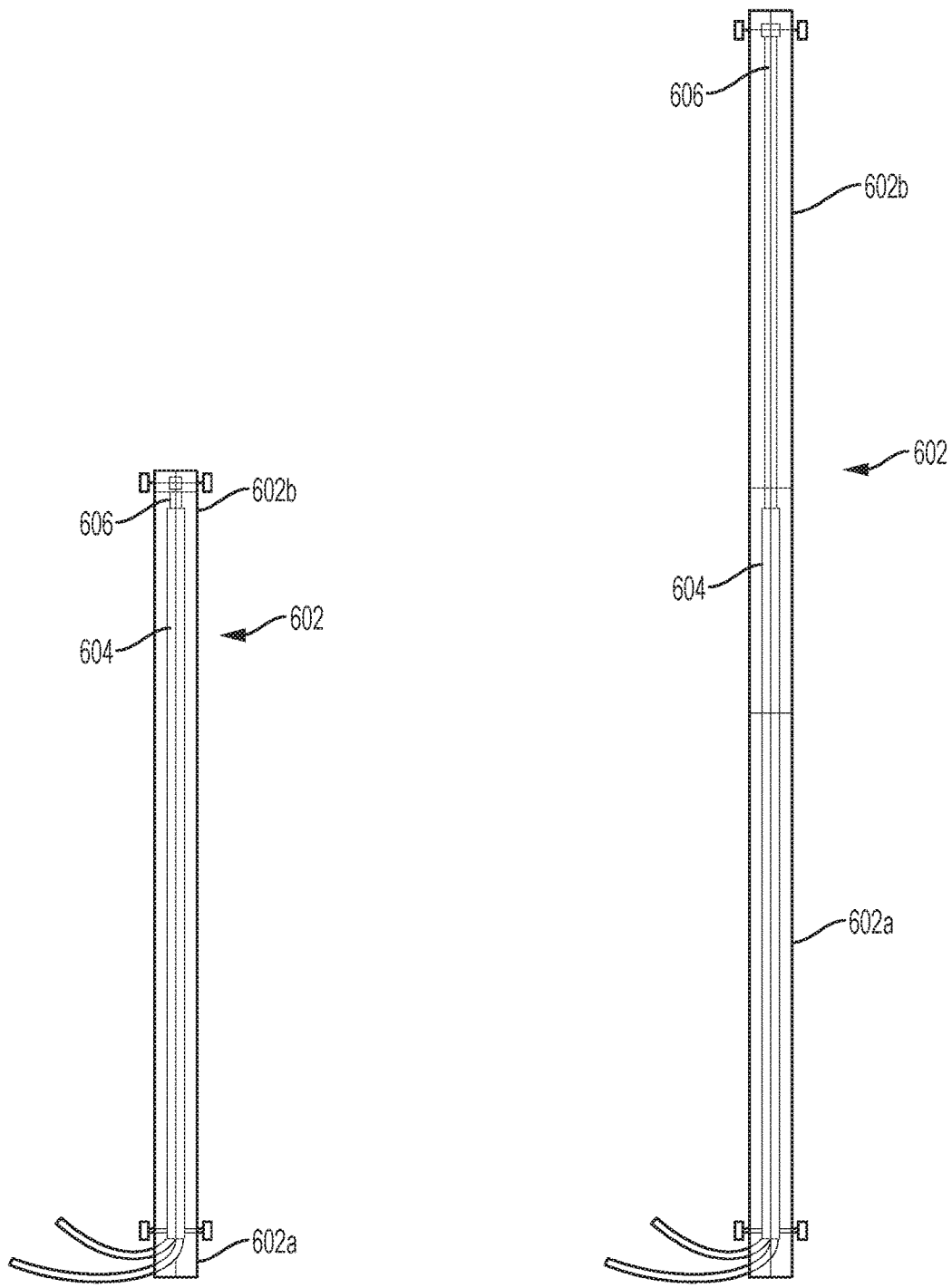
FIG. 6A is a schematic depiction of an alternative embodiment of the pipes used to support the passenger compartment of the vehicle of the present invention in an lowered configuration.
FIG. 6B is a schematic depiction of an alternative embodiment of the pipes used to support the passenger compartment of the vehicle of the present invention in a lowered configuration.

In yet another embodiment, the hydraulic cylinders are removed from the center of the vehicle base and replaced, or alternatively retained and supplemented, with a set of telescoping pipes having a concentric hydraulic cylinder inside. Referring now to FIG. 6A and FIG. 6B, which show a pipe system 602 having an inner pipe 602a and an outer pipe 602b. A hydraulic cylinder 604 is located inside the inner pipe 602a. The piston rod 606 of the hydraulic cylinder 604 is retracted in FIG. 6A, thereby allowing the outer pipe 602b to cover a majority of the inner pipe 602a, such as when the passenger platform is in the lowered position. When the platform is raised, the piston rod 606 is extended and the outer pipe 602b slides over the inner pipe 602a as piston rod 606 extends.

While the invention is shown as having four pipe assemblies 102 at each corner of the vehicle's base 103, the system could be modified to include one, two, three or more than four pipe assemblies 102, as long as such assemblies are sufficient to support the passenger platform 103.

In the alternative embodiment shown in FIG. 3 and FIG. 4, the hydraulic cylinders 112, 114 provide uniform forced movement in both the up and down directions through the use of hydraulic flow dividers, which overcome friction and keep the unit from binding. In addition, all of the controls required for the operation of the vehicle 100, such as braking and steering controls, are accomplished by wiring, flexible tubing, or flexible cable running through the flexible conduit 108, which simplifies the system since there are no direct mechanical links from the vehicle base to the passenger compartment except for the lifting mechanism.

It may be desirable to include various safety measures in various embodiments of the present invention. For example, the pipe assemblies 102 may be designed so that, when the passenger compartment 103 is fully lowered, there is a safety gap or space between the passenger compartment 110, that is the lowermost surface 113 of the passenger compartment shown in FIGS. 1, 2, and 7, and the uppermost surface 104 of the vehicle base 103 as shown in FIGS. 1, 2, and 7. This safety gap will reduce the risk of, or eliminate entirely, the pinching or severing of digits or limbs when the passenger compartment 110 is lowered to the lowermost position.

In addition, it may be useful to govern the speed of the vehicle so that the maximum speed at which the vehicle may travel is limited when the passenger compartment is not fully lowered. This would prevent the vehicle's operator from going too fast when the vehicle's center of gravity is high due to the raised passenger compartment.

To use the vehicle of the present invention, the operator simply climbs a set of stairs to enter the vehicle, closes the door and sits in the driver's seat. The operator can then drive the vehicle in its normal mode. When the operator is interested in obtaining a better view of wildlife or otherwise increase his field of vision, he can raise the passenger compartment either incrementally or to its fully raised position. In some circumstances, the operator may elect to maintain the passenger compartment at a lower elevation to see under trees or to avoid raised obstructions. When the operator encounters rough or uneven terrain, he can lower the passenger compartment to its lowest position to maximize the stability of the vehicle.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of methods for top driving vehicles known in the art, the detailed embodiments are intended to be illustrative only and should not be taken as limiting the scope of the invention. Rather, what is claimed as the invention is all such modifications as may come within the spirit and scope of the following claims and equivalents thereto. In particular, in some instances, one or more features disclosed in connection with one embodiment can be used alone or in combination with one or more features of one or more other embodiments. More generally, the various features described herein may be used in any working combination.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

I claim:

1. A top drive vehicle including:
(a) an elongated base extending along a base longitudinal axis;
(b) a set of wheels connected to the elongated base so as to support the elongated base on a surface, the set of wheels being mounted along a frontmost wheel attachment axis and a rearmost wheel attachment axis, the elongated base having a base midpoint along the base longitudinal axis being equidistant from both the frontmost wheel attachment axis and the rearmost wheel attachment axis long the base longitudinal axis;
(c) a passenger compartment extending along a passenger compartment axis, the passenger compartment axis being parallel to the base longitudinal axis;
(d) a guide assembly connected between the elongated base and the passenger compartment, the guide assembly including a set of one or more front guides located forward of the base midpoint and a set of one or more rear guides located rearward of the base midpoint, the guide assembly being moveable between a lowered position in which the passenger compartment is in a lowermost position relative to the elongated base, and a raised position in which the passenger compartment is in an elevated position above the elongated base relative to the lowermost position;
(e) each front guide and each rear guide comprising a respective telescoping assembly including a respective lower guide member and a respective upper guide member, each lower guide member being rigidly connected to the elongated base at least at a lower guide member lower end, and each upper guide member being rigidly connected to the passenger compartment at least at an upper guide member upper end;
(f) no more than one linear actuator system connected at an actuator system first end to the passenger compartment and connected at an actuator system second end to the elongated base, the linear actuator system being operable to move between a retracted condition in which the passenger compartment resides in the passenger compartment lowermost position, wherein the linear actuator system is made up of a single linear actuator or is made up of multiple linear actuators connected together in series; and an extended condition in which the passenger compartment resides in the passenger compartment elevated position; and
(g) a linear actuator system control mounted on the passenger compartment, the linear actuator system control in a first state thereof being operable to cause the linear actuator system to move from the retracted condition to the extended condition, the linear actuator system control in a second state thereof being operable to cause the linear actuator system to move from the extended condition to the retracted condition.

2. The top drive vehicle of claim 1 wherein:
(a) the guide assembly includes a set of two front guides and a set of two rear guides;
(b) the set of two front guides are located along the base longitudinal axis between the base midpoint and the frontmost wheel attachment axis, with a first one of the two front guides being connected to the passenger compartment at a first front location of the passenger compartment and with a second one of the two front guides being connected to the passenger compartment at a second front location of the passenger compartment laterally spaced apart from the first front location; and
(c) the set of two rear guides are located along the base longitudinal axis between the base midpoint and the rearmost wheel attachment axis, with a first one of the two rear guides being connected to the passenger compartment at a first rear location of the passenger compartment and with a second one of the two rear guides being connected to the passenger compartment at a second rear location of the passenger compartment laterally spaced apart from the first rear location of the passenger compartment.

3. The top drive vehicle of claim 2 further including:
(a) a front seat mounted in the passenger compartment forward of the base midpoint; and
(b) a rear seat mounted in the passenger compartment rearwardly of the set of two rear guides.

4. The top drive vehicle of claim 1 wherein:
(a) the elongated base defines an uppermost surface and the passenger compartment defines a lowermost surface; and
(b) when the passenger compartment is in the passenger compartment lowermost position, a safety gap remains between the elongated base uppermost surface and the passenger compartment lowermost surface.

5. The top drive vehicle of claim 1 wherein:
(a) the elongated base has a maximum height dimension at points between the frontmost wheel attachment axis and the rearmost wheel attachment axis that is less than a maximum height dimension of the passenger compartment between the frontmost wheel attachment axis and the rearmost wheel attachment axis;
(b) the elongated base defines an uppermost surface and the passenger compartment defines a lowermost surface; and
(c) when the passenger compartment is in the passenger compartment lowered position, a safety gap remains between the elongated base uppermost surface and the passenger compartment lowermost surface.

6. The top drive vehicle of claim 1 wherein the linear actuator system includes multiple linear actuators connected in series with an upper end of a first one of the multiple linear actuators is connected to the passenger compartment and a lower end of a second one of the multiple linear actuators is connected to the elongated base.

7. The top drive vehicle of claim 1 wherein the linear actuator system includes a multi-stage linear actuator that extends through two or more stages.

8. The top drive vehicle of claim 1 wherein the linear actuator system is enclosed within one of the front guides or one of the rear guides.

9. The top drive vehicle of claim 1 wherein at least one front guide or rear guide includes a seal between the respective upper guide member and respective lower guide member.

10. The top drive vehicle of claim 1 wherein:
(a) the elongated base includes a base lower structure spaced apart from a base upper structure;
(b) the passenger compartment includes a passenger compartment lower structure spaced apart from a passenger compartment upper structure; and
(c) the linear actuator system is connected between the base lower structure and the passenger compartment lower structure.

11. A top drive vehicle including:
(a) an elongated base extending along a base longitudinal axis;
(b) a set of wheels connected to the elongated base so as to support the elongated base on a surface, the set of wheels being mounted along a frontmost wheel attachment axis and a rearmost wheel attachment axis, the elongated base having a base midpoint along the base longitudinal axis being equidistant from both the frontmost wheel attachment axis and the rearmost wheel attachment axis long the base longitudinal axis;
(c) a passenger compartment extending along a passenger compartment axis, the passenger compartment axis being parallel to the base longitudinal axis;
(d) a guide assembly connected between the elongated base and the passenger compartment, the guide assembly being moveable between a lowered position in which the passenger compartment is in a lowermost position relative to the elongated base and a raised position in which the passenger compartment is in an elevated position elevated above the elongated base relative to the lowermost position, the guide assembly including (i) a set of two front guides located along the base longitudinal axis between the base midpoint and the frontmost wheel attachment axis with a first one of the two front guides being connected to the passenger compartment at a first front location of the passenger compartment and with a second one of the two front guides being connected to the passenger compartment at a second front location of the passenger compartment laterally spaced apart from the first front location and including (ii) a set of two rear guides located along the base longitudinal axis rearward of the base midpoint, with a first one of the two rear guides being connected to the passenger compartment at a first rear location of the passenger compartment and with a second one of the two rear guides being connected to the passenger compartment at a second rear location of the passenger compartment laterally spaced apart from the first rear location of the passenger compartment;
(e) each front guide and each rear guide comprising a respective telescoping assembly including a respective lower guide member and a respective upper guide member, each lower guide member being rigidly connected to the elongated base at least at a lower guide member lower end, and each upper guide member being rigidly connected to the passenger compartment at least at an upper guide member upper end;
(f) no more than one linear actuator system connected at an actuator system first end to the passenger compartment and connected at an actuator system second end to the elongated base, the linear actuator system being operable to move between a retracted condition in which the passenger compartment resides in the passenger compartment lowermost position and an extended condition in which the passenger compartment resides in the passenger compartment elevated position, wherein the linear actuator system is made up of a single linear actuator or is made up of multiple linear actuators connected together in series; and
(g) a linear actuator system control mounted on the passenger compartment, the linear actuator system control in a first state thereof being operable to cause the linear actuator system to move from the retracted condition to the extended condition, the linear actuator system control in a second state thereof being operable to cause the linear actuator system to move from the extended condition to the retracted condition.

12. The top drive vehicle of claim 11 wherein the set of two rear guides are located along the base longitudinal axis between the base midpoint and the rearmost wheel attachment axis.

13. The top drive vehicle of claim 11 further including:
(a) a front seat mounted in the passenger compartment forward of the base midpoint; and
(b) a rear seat mounted in the passenger compartment rearwardly of the set of two rear guides.

14. The top drive vehicle of claim 11 wherein:
(a) the elongated base defines an uppermost surface and the passenger compartment defines a lowermost surface; and
(b) when the passenger compartment is in the passenger compartment lowermost position, a safety gap remains between the elongated base uppermost surface and the passenger compartment lowermost surface.

15. The top drive vehicle of claim 11 wherein:
(a) the elongated base has a maximum height dimension at points between the frontmost wheel attachment axis and the rearmost wheel attachment axis that is less than a maximum height dimension of the passenger compartment between the frontmost wheel attachment axis and the rearmost wheel attachment axis;
(b) the elongated base defines an uppermost surface and the passenger compartment defines a lowermost surface; and
(c) when the passenger compartment is in the passenger compartment lowermost position, a safety gap remains between the elongated base uppermost surface and the passenger compartment lowermost surface.

16. The top drive vehicle of claim 11 wherein:
(a) the elongated base includes a base lower structure spaced apart from a base upper structure;
(b) the passenger compartment includes a compartment lower structure spaced apart from a compartment upper structure; and
(c) the linear actuator system is connected between the base lower structure and the compartment lower structure.

* * * * *

UNITED STATES PATENT AND TRADEMARK OFFICE
CERTIFICATE OF CORRECTION

PATENT NO. : 10,486,753 B2
APPLICATION NO. : 16/030028
DATED : November 26, 2019
INVENTOR(S) : Russell Eppright It is certified that error appears in the above-identified patent and that said Letters Patent is hereby corrected as shown below:

In the Claims

At Column 9, Lines 64-67, delete ", wherein the linear actuator system is made up of a single linear actuator or is made up of multiple linear actuators connected together in series;".

At Column 10, Line 2, immediately following the word "position" insert --, wherein the linear actuator system is made up of a single linear actuator or is made up of multiple linear actuators connected together in series--.

Signed and Sealed this
Twenty-fourth Day of January, 2023

Katherine Kelly Vidal
*Director of the United States Patent and Trademark Office*